United States Patent [19]

Meier et al.

[11] 4,140,290
[45] Feb. 20, 1979

[54] V/STOL AIRCRAFT WITH THRUST CONTROL

[75] Inventors: Hans-Justus Meier; Herbert Sadowski, both of Bremen, Fed. Rep. of Germany

[73] Assignee: Vereinigte Flugtechnische Werke-Fokker GmbH, Bremen, Fed. Rep. of Germany

[21] Appl. No.: 696,207

[22] Filed: Jun. 15, 1976

Related U.S. Application Data

[63] Continuation of Ser. No. 373,927, Jun. 27, 1973, abandoned.

[30] Foreign Application Priority Data

Jul. 7, 1972 [DE] Fed. Rep. of Germany ....... 2233352

[51] Int. Cl.² .............................................. B64C 15/08
[52] U.S. Cl. ...................................... 244/52; 244/12.5
[58] Field of Search ................ 244/12 R, 12 B, 12 D, 244/52, 12.1, 12.3, 12.5, 23 D; 239/265.35

[56] References Cited

U.S. PATENT DOCUMENTS

| 3,003,312 | 10/1961 | Jewell | 239/265.35 |
| 3,164,337 | 1/1965 | Hooper | 244/12 D |
| 3,173,628 | 3/1965 | Marchant et al. | 244/12 D |
| 3,178,887 | 4/1965 | Wilde et al. | 244/52 X |
| 3,528,247 | 9/1970 | Riemerschmid | 244/12 D |
| 3,703,266 | 11/1972 | Lincks et al. | 244/52 |
| 3,912,201 | 10/1975 | Bradbury | 244/52 X |

FOREIGN PATENT DOCUMENTS 1941573 2/1971 Fed. Rep. of Germany ........ 244/12 D

Primary Examiner—Barry L. Kelmachter
Attorney, Agent, or Firm—Smyth, Pavitt, Siegemund, Jones & Martella

[57] ABSTRACT

The roll control of V/STOL aircraft is augmented by deriving a controlled, transverse thrust component from the lift producing engine. This is accomplished by redirecting a jet to introduce such a component not compensated by a counteracting jet or jet component of the craft. Jets can be redirected through pivoting of bent pipe sections of gimbal-hung nozzles.

1 Claim, 6 Drawing Figures

V/STOL AIRCRAFT WITH THRUST CONTROL

This is a Continuation Application of application Ser. No. 373,927, filed June 27, 1973, now abandoned.

BACKGROUND OF THE INVENTION

The present invention relates to improvements in V/STOL type aircraft, having at least one principle, thrust producing propulsion engine, either constructed as pivot or swivel nozzle, and/or having additional lift engines. Moreover, the aircraft is presumed to have control nozzles for controlling the craft during takeoff, landing and during the respectively succeeding and preceding transition phases. These control nozzles bleed air from the/or an engine.

The amount of air which can be bled or tapped from one of the engines is quite limited. Usually, one can tap an engine only to the extent that the available flow through the control nozzles just suffices for normal and regular operation. An increase in that control flow is usually not possible.

The aforementioned limitation has, for example, as a consequence that an increased load, such as additional loads on the wings, cannot be accommodated. Any interfering moment on the roll axis in the hovering phase may no longer be compensated under such circumstances, or only after a significant delay. As this lagging response constitutes an immediate and present danger to the craft, steps must be taken to avoid it.

It has been suggested to avoid these difficulties by increasing the available control moment during the critical periods by heating the pressurized air in the control nozzles or to provide supplementary rocket engines. Both proposals suffer from the drawback that weight is added to the craft, as additional pipes, ignition apparatus, tanks etc. are required. Moreover, heating in particular introduces significant delay.

SUMMARY OF THE INVENTION

It is an object of the present invention to improve controllability of a V/STOL aircraft particularly with regards to turning on its roll axis, and to provide for such control with very little added weight, while the response is as quick as needed during these critical flight phases.

It is another object of the present invention to augment the control capabilities of a V/STOL aircraft particularly as far as control for turning on the roll axis is concerned, assuming that control nozzles operating with air tapped or bled from the/or a main engine are already provided for.

In accordance with the preferred embodiment of the invention, at least one of the thrust producing propulsion engines is provided with means for controlling the thrust vector transversely to the longitudinal axis of the craft. Particularly, pivot or swivel nozzles, when provided on the main engine, are constructed as multiple part pipe elbows or bent pipes, whereby at least the respective last part thereof can be turned on an axis which is situated in a plane parallel to the X-Z plane of the craft. The invention can be practiced in the alternative in that the exit nozzles of the lift producing engines are suspended in gimbals. This should be true for engines arranged directly at the fuselage along the longitudinal axis of the craft as well as for engines suspended in pods extending laterally from the fuselage or mounted at the wing tips.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1A, 1B, 1C:
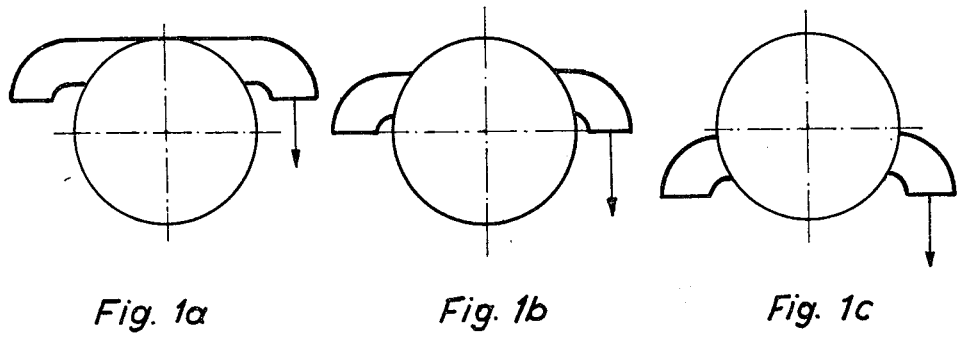
FIGS. 1a, 1b and 1c are three schematic showings for three different positions of pivot nozzles on a main engine.

Proceeding now to the detailed description of the drawings, FIGS. 1a, b, c, illustrate cross sections through a main propulsion engine with pivot or swivel nozzles shown in three different positions (for three different modes of construction). The nozzles in FIG. 1a have exit openings above the horizontal plane that runs through the center of gravity of the aircraft. The exit openings of the nozzles are situated in that plane in FIG. 1b and below that plane in FIG. 1c.

Figure 2:
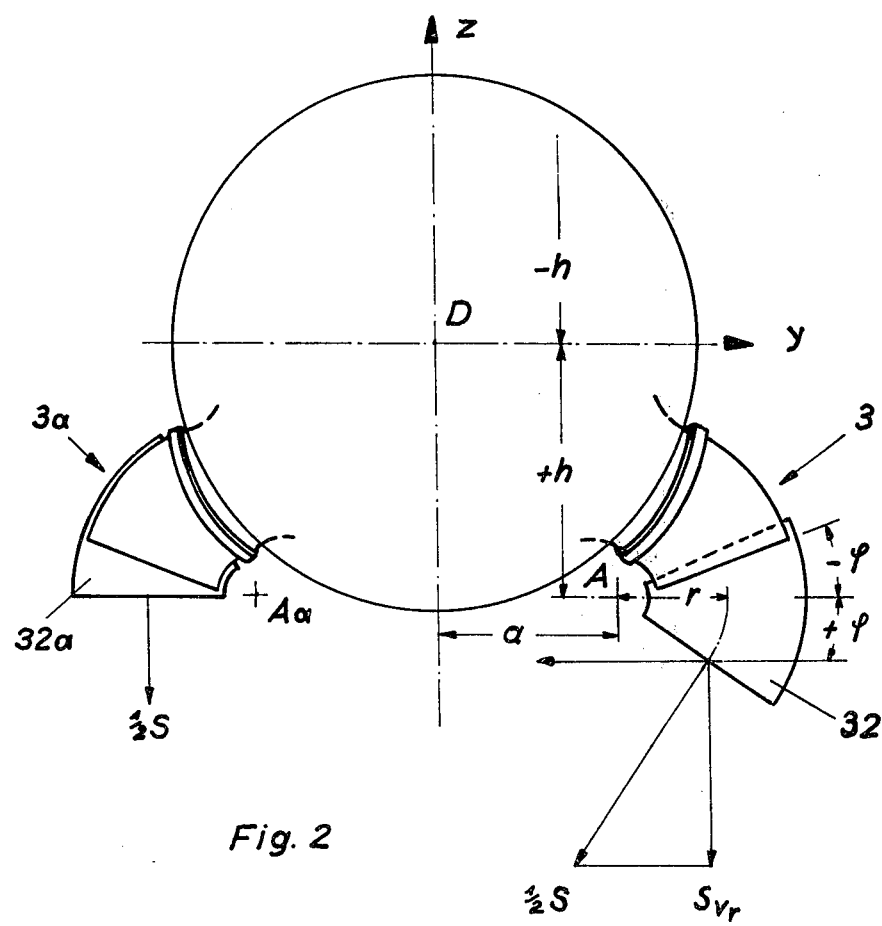
FIG. 2 illustrates the specific case of FIG. 1c in greater detail as to relevant dimensions for practicing the preferred embodiment of the invention.

FIG. 2 shows the geometric relation in greater detail and particularly for the construction as per FIG. 1c. The geometric relations depicted in FIG. 2 permit calculation of the control moment made available through control of the direction of the thrust vector. Point D denotes the center of gravity of the aircraft. S stands for the thrust vector, being divided into two equal components S/2 which superimpose on the center of gravity as a thrust vector S.

The FIG. 2 shows two swivel nozzles 3 and 3a, for pivoting on axes in the plane of the drawing to obtain a directional change of the main thrust, from forward propulsion during cruising to lift producing operation. The swivel axes are situated in the plane (or in a plane parallel to) the plane of the drawing. Each nozzle has a pivotable front portion, 32 and 32a, respectively, and the two crosses A, Aa, denote the two axes which extend transverse to the plane of the drawing and about which the nozzle portions 32 and 32a turn for purposes of thrust vector control in accordance with the preferred embodiment of the invention. The two axes A, Aa, have similar but oppositely oriented distances a from the X-Z plane of the aircraft as running through the center of gravity, transverse to the plane of the drawing. Direction X particularly runs parallel to the axes A, Aa; axis Z extends vertically.

The two axes A, Aa, each have distance h from that particular horizontal plane which runs through the center of gravity D. Character r denotes the distance of the center of the exit plane of bent nozzle portion 32 from axis A, and $\phi$ is the pivot angle of nozzle portion 2 with $\phi = 0$ denoting an exit plane of the nozzle in the horizontal. One can readily see that $h = 0$ denotes the situation of FIG. 1b and $h < 0$ denotes the situation of FIG. 1a.

Figure 3:
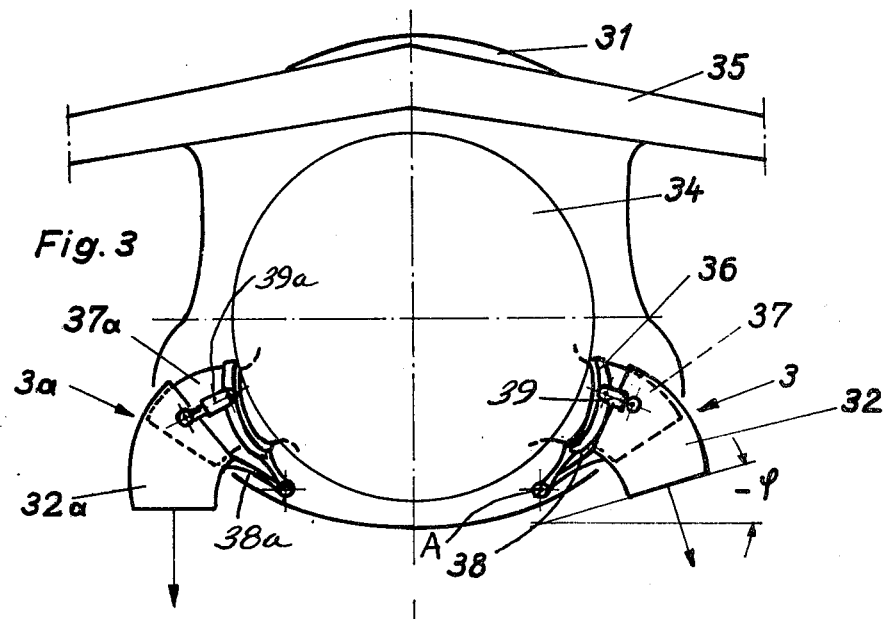
FIG. 3 shows construction details for an arrangement as per FIG. 2.

Relevant construction details are shown in FIG. 3. The drawing shows schematically a cross section through a fuselage 31 in the level of the pivot nozzles 3 and 3a, arranged on the main thrust producing engine 34. The aircraft has a wing 35, and reference numeral 36 denotes a rotating track and ring mount for the nozzles 3, 3a, to obtain selectively thrust for cruising and for lifting. The nozzles each have a bent pipe portion 37, 37a, and the pivot portion 32, 32a, telescoping over fixed bent pipe 37, 37a, respectively. These pivot portions 32, 32a are on arms 38, 38a, respectively, for pivoting the pivot or bent pipes portions 32, 32a about axes A and Aa, respectively. Actuators 39 and 39a are, respectively, connected to the bent pipes 32, 32a to obtain the pivot motion about the axes A and Aa. As can be seen, these actuators may pivot the bent pipes so that each has a different positioning angle as the respective other one to obtain differently directed thrust vectors. The bleeder control nozzles are not shown, as the invention is only directed to means for supplementing and enhancing the control effect of such control nozzles, by using thrust vector control as described.

The two pivot nozzle elements 32 and 32a are shown in different pivot positions. Using the terminology introduced above, nozzle element 32 is pivoted by $-\phi$ from a normal position of $\phi = 0$ which is the one shown for element 32a, whereupon the thrust vector receives an outwardly oriented component. $\phi > 0$ produces an inwardly oriented thrust component as mentioned above.

Figure 4:
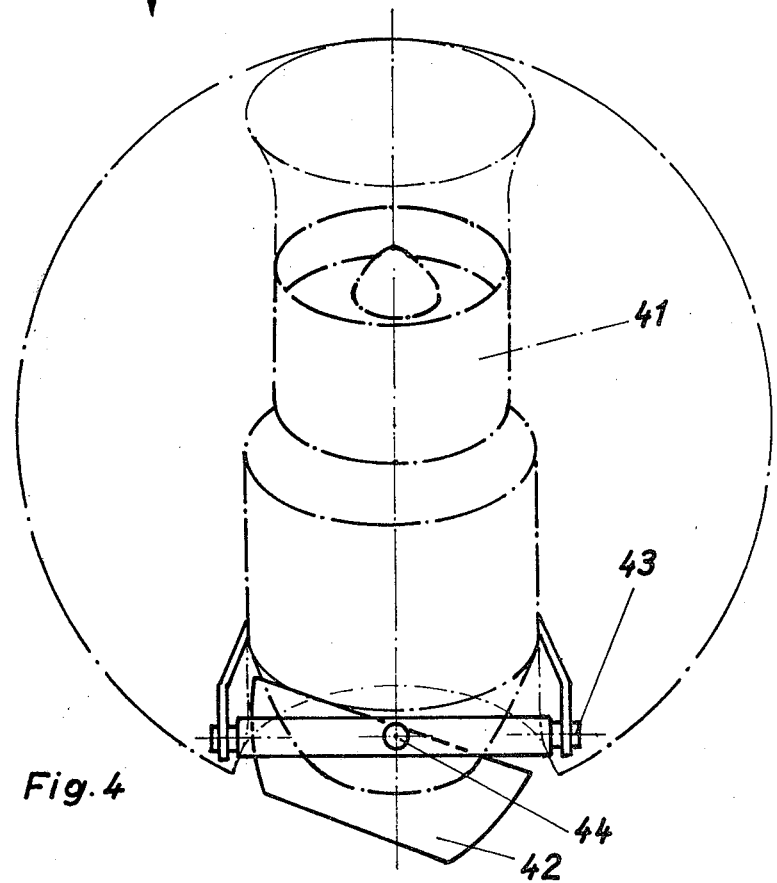
FIG. 4 shows how the invention can be practiced on a lift producing engine with gimbal suspension of the nozzle.

FIG. 4 shows a separate lift producing engine 41 with pivotable exit nozzle 42 which is hung in gimbals for pivoting on transverse axes 43 and 44.

Turning now to common details of the operation of the several devices as shown, I turn again to FIG. 2. The additional control moment Mst is rather easily calculated for the case of a downwardly directed thrust vector of the main engine. As stated, each pivot nozzle produces half of the total thrust of $\frac{1}{2}$ S. Consequently, the resulting control momentum Mst is of the same magnitude for $\phi = 0$ disposition of both nozzle elements 32, 32a.

Assuming the nozzle 32 (but not 32a) is pivoted to a position $\phi > 0$ as shown in FIG. 2, a different control moment on the roll axis of the craft is produced because the two nozzles direct thrust producing jets in different directions, which are not symmetrical to the vertical, X–Z plane. The magnitude of that control moment is determined in the following equation.

$$\text{Mst} = -\tfrac{1}{2} \cdot S\,(a+r) + \tfrac{1}{2}\,S[\sqrt{a^2 + h^2}\cos(\phi\text{-arctg}\,(h/a)) + \gamma]$$

In this equation, distance h is taken positive when the exit plane of the pivot nozzle is as shown in FIG. 1c, while h < 0 is true for a disposition as shown in FIG. 1a, and h = 0 is true for the particular case of FIG. 1b.

Due to the fact that the thrust of the nozzle 32 in FIG. 2 produces an inwardly directed component Svr, while nozzle 32a does not the resulting control moment will cause the craft to turn clockwise on the roll axis, even though the vertical component of the thrust of that nozzle is somewhat smaller than the $\frac{1}{2}$ S thrust continued at nozzle 3a. A counter clockwise control moment will be produced in the specific case of FIG. 3.

Aircraft having a rather small moment of inertia as to the roll axis will no longer need the usual pressurized air for reaction control by means of nozzles using pressurized air and disposed at the wing tips. The thrust vector pivot control is adequately provided for by the device as shown. Thus, feeder paths, nozzles etc. are no longer needed for the wings, and the thusly freed wing space is available for fuel storage, or the entire wing construction can be greatly simplified.

It was found that the resulting control moment can be increased by 50% as compared with a conventional bleed control as heretofore used for V/STOL aircraft.

We claim:

1. In a V/STOL aircraft having a thrust producing means which includes a first nozzle and a second nozzle for discharging thrust producing jets and being disposed laterally offset to a longitudinal axis of the aircraft, and on opposite sides of a vertical plane running through the longitudinal axis, said first and second nozzles respectively having first and second bent pipes;

means for mounting said first bent pipe for pivoting said first bent pipe about a first axis extending parallel to said longitudinal axis and on one side of said plane to thereby direct a first jet exiting from the first nozzle at a first variable angle relative to the vertical plane;

means for mounting said second bent pipe for pivoting said second bent pipe about a second axis extending parallel to the said longitudinal axis and on the other side of said plane to thereby direct a second jet exiting from the second nozzle at a second variable angle relative to the vertical plane; and means for operating at least one means for pivoting the bent pipes of the nozzle to a different degree, to direct the jets in different directions to obtain a thrust component, compensating and counteracting an interfering roll moment of the aircraft as produced otherwise.

* * * * *